(12) United States Patent
Kuo et al.

(10) Patent No.: US 8,842,136 B2
(45) Date of Patent: Sep. 23, 2014

(54) METHOD FOR ADAPTIVELY ADJUSTING SIZES OF VIRTUAL KEYS AND DISPLAY DEVICE USING THE SAME

(75) Inventors: Chih-Jen Kuo, New Taipei (TW); Kuang-Cheng Chao, New Taipei (TW)

(73) Assignee: AmTRAN TECHNOLOGY Co., Ltd., New Taipei (TW)

( * ) Notice: Subject to any disclaimer, the term of this patent is extended or adjusted under 35 U.S.C. 154(b) by 267 days.

(21) Appl. No.: 13/421,857

(22) Filed: Mar. 15, 2012

(65) Prior Publication Data

US 2013/0182015 A1 Jul. 18, 2013

(30) Foreign Application Priority Data

Jan. 12, 2012 (TW) ............................... 101101269 A

(51) Int. Cl.
*G09G 5/00* (2006.01)
*G06F 3/048* (2013.01)

(52) U.S. Cl.
USPC .............................. 345/660; 715/773; 715/788

(58) Field of Classification Search
CPC .............. G06F 3/04886; G06F 3/0238; G06F 3/04897; G06F 3/0487; G06F 3/04892; G06F 3/048
See application file for complete search history.

(56) References Cited

U.S. PATENT DOCUMENTS

| | | | |
|---|---|---|---|
| 2010/0259561 A1* | 10/2010 | Forutanpour et al. | 345/660 |
| 2010/0315266 A1* | 12/2010 | Gunawardana et al. | 341/22 |
| 2011/0078613 A1* | 3/2011 | Bangalore | 715/773 |
| 2011/0163962 A1* | 7/2011 | Ida | 345/169 |
| 2011/0242137 A1* | 10/2011 | Lee et al. | 345/660 |

* cited by examiner

*Primary Examiner* — Carlos Perromat
*Assistant Examiner* — Nurun N Flora
(74) *Attorney, Agent, or Firm* — Jianq Chyun IP Office

(57) ABSTRACT

A method for adaptively adjusting sizes of virtual keys and a display device using the same are provided. The display device displays a virtual keyboard, and the virtual keyboard is arranged with a plurality of virtual keys that can be chosen remotely by a plurality of direction keys of a remote controller. The method includes following: receiving cursor movement information and confirmation information transmitted by the remote controller; converting the cursor movement information and confirmation information into characters of virtual keys of a first key size configuration model of the virtual keyboard, and converting the characters into words; performing an operation on the words respectively by using a preset algorithm to generate a second key size configuration model of the virtual keyboard; and adjusting horizontal sizes of at least a part of the virtual keys of the virtual keyboard according to the second key size configuration model.

16 Claims, 11 Drawing Sheets

|  | 210 | | | | | | | | | |
|---|---|---|---|---|---|---|---|---|---|---|
| | 21026 | | | | | | | | | 21018 |
| 2101 | Q | W | E | R | T | Y | U | I | O | P |
| 2102 | A | S | D | F | G | H | J | K | L | |
| 2103 | | Z | X | C | V | B | N | M | | |

|  | 210 | | | | | | | | | |
|---|---|---|---|---|---|---|---|---|---|---|
| | 21026 | | | | | | | | | 21018 |
| 2101 | Normal | | Normal | Normal | Normal | Normal | Normal | Normal | Normal | Normal |
| 2102 | Normal | | Normal | Normal | Normal | Normal | Normal | Normal | Normal | |
| 2103 | | | Normal | Normal | Normal | Normal | Normal | Normal | | |

| 42005 | | | | | | | | | | 42004 | |
|---|---|---|---|---|---|---|---|---|---|---|---|
| Q | W | E | R | T | Y | U | I | 42001 | O | P | |
| | A | S | D | F | G | H | J | K | L | | |
| | Z | X | C | V | B | N | M | 42003 | | | |

| 43005 | | | | | | | | | 43004 | |
|---|---|---|---|---|---|---|---|---|---|---|
| Normal | Normal | Normal | Normal | Normal | Normal | Normal | Normal | 43001 Normal | Two-side expandeds | Normal |
| Normal | Normal | Normal | Normal | Two-side expanded | Leftward expanded | Normal | Normal | Rightward expanded | | |
| Normal | Normal | Normal | Normal | Normal | Normal | Normal | 43003 | 43002 | | |

METHOD FOR ADAPTIVELY ADJUSTING SIZES OF VIRTUAL KEYS AND DISPLAY DEVICE USING THE SAME

CROSS-REFERENCE TO RELATED APPLICATION

This application claims the priority benefit of Taiwan application serial no. 101101269, filed on Jan. 12, 2012. The entirety of the above-mentioned patent application is hereby incorporated by reference herein and made a part of this specification.

BACKGROUND OF THE INVENTION

1. Field of the Invention

The present invention generally relates to a method for adjusting sizes of virtual keys, and in particular, to a method for adaptively adjusting sizes of virtual keys, applicable in a remote controller with direction keys to perform input actions to a display device, and a display device using the same method.

2. Description of Related Art

With development of technology, conventional television (TV) sets or single-functional home appliances are gradually replaced by video players or intelligent home appliances with more and more functions. Accordingly, functions of remote controllers for controlling these video players or intelligent home appliances become more and more diversified, so as to browse web pages on the Internet by using a TV device.

Generally speaking, it takes lots of time to use a remote controller only having direction keys to input an integrated word to a display device, because the remote controller can merely control a cursor on the display device to perform movement actions as up, down, left or right grid by grid, and choose a plurality of virtual keys of the virtual keyboard displayed by the display device to represent a plurality of characters respectively by using the direction keys. If the movement distance between two random characters that need to be input continuously is far, it takes more time to move the cursor by controlling the direction keys to choose the characters to be input.

FIG. 1C is a schematic diagram of a remote controller having direction keys and a confirmation key. FIG. 2A is a schematic diagram of a virtual keyboard displayed by a conventional display device. Referring to FIG. 1 and FIG. 2 at the same time, an exemplary embodiment is used here to explain a conventional method for controlling the direction keys (an UP button 1201, a DOWN button 1202, a LEFT button 1203 and a RIGHT button 1204) of the remote controller 120 by a user to control a cursor to move on the virtual keyboard 210 to input an example word "google". Firstly, the user moves the cursor on the virtual keyboard 210 to the virtual key corresponding to "g" in "google", and chooses the virtual button by using the remote controller 120; when the user is intended to continuously input "o" in "google", the user uses the RIGHT button 1204 to control the cursor to move rightward for 4 grids and uses the UP button 1201 to move the cursor upward for 1 grid, and at this time, the cursor is moved to the virtual key corresponding to "o", and the virtual button is chosen; and then, the user moves the cursor continuously to input "o", "g", "l" and "e" sequentially.

In the aforementioned series of actions, in order to input one word of "google", the user needs to totally move the cursor for 21 times, and the process is too slow and takes too much time. Therefore, how to enhance speed of choosing characters that are not adjacent to each other by using the direction keys of the remote controller is an important topic in the field.

SUMMARY OF THE INVENTION

Accordingly, the present invention is directed to provide a method for adaptively adjusting sizes of virtual keys and a display device using the same, in which, according to a plurality of words input by a user, the size of each virtual key of the virtual keyboard can be adjusted, so as to achieve the efficacy of rapidly inputting characters that form each word.

The present invention provides a method for adaptively adjusting sizes of virtual keys, adapted to a display device capable of displaying a virtual keyboard, where the virtual keyboard is arranged with a plurality of virtual keys that can be chosen remotely by a plurality of direction keys of a remote controller. The method includes: receiving a plurality of characters corresponding to a plurality of virtual keys of a first key size configuration model of the virtual keyboard transmitted by the remote controller; converting the characters into a plurality of words, and performing an operation on the words respectively by using a preset algorithm to generate a second key size configuration model of the virtual keyboard; and adjusting horizontal sizes of a part of the virtual keys or a plurality of virtual keys of the virtual keyboard according to the second key size configuration model.

In an embodiment of the present invention, the step of performing the operation on the words respectively by using the preset algorithm to generate the second key size configuration model includes following: generating a plurality of candidate models, where the candidate models include identical number of variables corresponding to the virtual keys respectively; for the candidate models, calculating a plurality of numbers of movements required to be performed to input each word of the words by using the direction keys of the remote controller respectively, and adding up the numbers of movements as a fitness function operation result, and then, sorting the candidate models in a descending order according to the fitness function operation results of the candidate models; and additionally, selecting one of the candidate models as the second key size configuration model according to the sorting order of the candidate models.

In an embodiment of the present invention, the step of calculating the number of movements for the candidate models required to be performed to input each of the words by using the plurality of direction keys of the remote controller respectively and adding up the numbers of movements as the fitness function operation result includes following: selecting one of the candidate models, calculating a number of movements required to be performed to input each of the words by using the plurality of direction keys of the remote controller respectively as a number of movements of the word; and adding up the numbers of a plurality of movements of the words as the fitness function operation result of the chosen candidate model.

In an embodiment of the present invention, the step of selecting one of the candidate models as the second key size configuration model according to the sorting order of the candidate models includes following: selecting a candidate model having a minimum fitness function operation result from the candidate models as the second key size configuration model.

In an embodiment of the present invention, the step of adjusting the horizontal sizes of a part of the virtual keys of the virtual keyboard includes: in one row or more rows of the virtual keyboard, expanding one or more keys in the row in one direction or two of directions of right and left.

In an embodiment of the present invention, the step of adjusting the horizontal sizes of a part of the virtual keys of the virtual keyboard includes following: in one row or more rows of the virtual keyboard, stopping expanding the rest keys in the row in the direction of right or left when a total number of the expanded part of virtual keys reaches a preset threshold.

In an embodiment of the present invention, the step of performing the operation on the words respectively by using the preset algorithm to generate the second key size configuration model includes: step (a), generating a plurality of candidate models (chromosome) randomly; step (b), with the candidate models as a plurality of parent candidate models, generating a plurality of child candidate models through crossover and mutation by using the preset algorithm, where each of the candidate models (chromosome) has a plurality of genes respectively corresponding to the variables; step (c), for all the obtained child candidate models, calculating a plurality of numbers of movements required to be performed to input each word of the words by using the plurality of direction keys of the remote controller respectively, and adding up information of the number of movements as a fitness function operation result; step (d), sorting all the candidate models according to the fitness function operation results of all the candidate models obtained in the step (c); step (e), for all the candidate models, reserving a part of the candidate models of which the corresponding fitness function operation results satisfy a preset screening condition as a plurality of parent candidate models for a next operation cycle; and step (f), repeating the step (a) to the step (e) until a number of iteration operations performed by using the preset algorithm reaches an iteration operation threshold, and selecting a candidate model having a minimum fitness function operation result from the currently reserved parent candidate models as the second key size configuration model.

The present invention provides a method for adaptively adjusting sizes of virtual keys, adapted to a display device that can display a virtual keyboard, where the virtual keyboard is arranged with a plurality of virtual keys that can be chosen remotely by a plurality of direction keys of a remote controller. The method includes following: receiving a plurality of character strings corresponding to a plurality of virtual keys of a first key size configuration model of the virtual keyboard transmitted by the remote controller, converting the character strings into a plurality of words, and setting a plurality of candidate models arranged for the virtual keyboard; then, for the candidate models, calculating a total number of movements required to be performed to input the words by using the direction keys of the remote controller respectively; additionally, selecting a candidate model having a minimum total number of movements from the candidate models as a second key size configuration model of the virtual keyboard; in addition, adjusting horizontal sizes of at least a part of the virtual keys of the virtual keyboard according to the second key size configuration model.

In an embodiment of the present invention, the step of adjusting the horizontal sizes of a part of the virtual keys of the virtual keyboard according to the second key size configuration model includes following: in one row or more rows of the virtual keyboard, expanding one key or more keys in the row in at least one direction of right or left.

In an embodiment of the present invention, the step of adjusting the horizontal sizes of a part of the virtual keys of the virtual keyboard includes following: in one row or more rows of the virtual keyboard, stopping expanding the rest keys in the row in the direction of right or left when a total number of the expanded part of virtual keys reaches a preset threshold.

The present invention provides a display device, capable of being controlled by a remote controller. The display device includes a memory, a display, a receiving unit and a controller. The memory is configured for storing program codes corresponding to a virtual keyboard, where the virtual keyboard is arranged with a plurality of virtual keys that can be chosen remotely by a plurality of direction keys of a remote controller. The display is connected to the memory and is configured for displaying the virtual keyboard. The receiving unit is connected to the memory, and receives a plurality of characters corresponding to the virtual keys of a first key size configuration model of the virtual keyboard transmitted by the remote controller. The controller is connected to the memory, the display and the receiving unit, and is configured for converting the characters into a plurality of words, performing an operation on the words respectively by using a preset algorithm to generate a second key size configuration model of the virtual keyboard, and adjusting horizontal sizes of at least a part of the virtual keys of the virtual keyboard according to the second key size configuration model, so as to output to the display unit to display the virtual keyboard of the second key size configuration model.

In an embodiment of the present invention, the controller further generates a plurality of candidate models, where the candidate models include identical number of variables corresponding to the virtual keys respectively. Next, the controller further calculates a plurality of numbers of movements required to be performed to input each word of the words by using the plurality of direction keys of the remote controller respectively based on the candidate models, and adds up the numbers of movements as a fitness function operation result. Further, the controller sorts the candidate models in a descending order according to the fitness function operation results of the candidate models. Additionally, the controller selects one of the candidate models as the second key size configuration model according to the sorting order of the candidate models.

In an embodiment of the present invention, the controller selects one of the candidate models, calculates the number of movements required to be performed to input each word of the words by using the plurality of direction keys of the remote controller respectively as the number of movements of the word; and adds up the numbers of a plurality of movements of the words as the fitness function operation result of the chosen candidate model.

In an embodiment of the present invention, the controller selects a candidate model having a minimum fitness function operation result from the candidate models as the second key size configuration model.

In an embodiment of the present invention, in one row or more rows of the virtual keyboard, the controller expands one key or more keys in the row in at least one direction of right or left.

In an embodiment of the present invention, in one row or more rows of the virtual keyboard, the controller stops expanding the rest keys in the row to the direction of right or left when the controller determines that a total number of the expanded part of virtual keys reaches a preset threshold.

Based on the aforementioned description, the present invention provides a method for adaptively adjusting sizes of virtual keys and a display device using the same method. A plurality of words is input by a user to a preset algorithm module to obtain an optimal size of each virtual key in the virtual keyboard, so as to achieve the effect that the user can rapidly input characters that form each word.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 2A and FIG. 2B are schematic diagrams of an initial virtual keyboard and states and corresponding horizontal sizes of virtual key thereof according to an embodiment of the present invention.

FIG. 4A and FIG. 4B are schematic diagrams of a virtual keyboard after changes and states and corresponding horizontal sizes of virtual keys thereof according to an embodiment of the present invention.

DESCRIPTION OF THE EMBODIMENTS

Figure 1A:
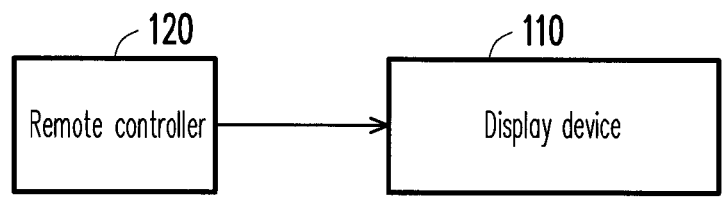
FIG. 1A is a schematic diagram of controlling a display device by using a remote controller according to an embodiment of the present invention.

Reference will now be made in detail to the present embodiments of the invention, examples of which are illustrated in the accompanying drawings. Wherever possible, the same reference numbers are used in the drawings and the description to refer to the same or like parts.

FIG. 1A is a schematic diagram of controlling a display device by using a remote controller according to an embodiment of the present invention. In FIG. 1A, a user may operate the remote controller 120 to transmit cursor movement information to remotely control a moving direction of a cursor displayed on the display device 110, and select a plurality of virtual keys of a virtual keyboard displayed on the display device 110, so as to further input a plurality of characters of the current key size configuration model of the virtual keyboard corresponding to the plurality of virtual keys. The display device 110 converts the characters into corresponding words and displays the converted words. The display device 110 is, for example, a television, a computer, a projector apparatus and corresponding projective screen (or projective plane) or display devices of other display forms.

Figure 1B:
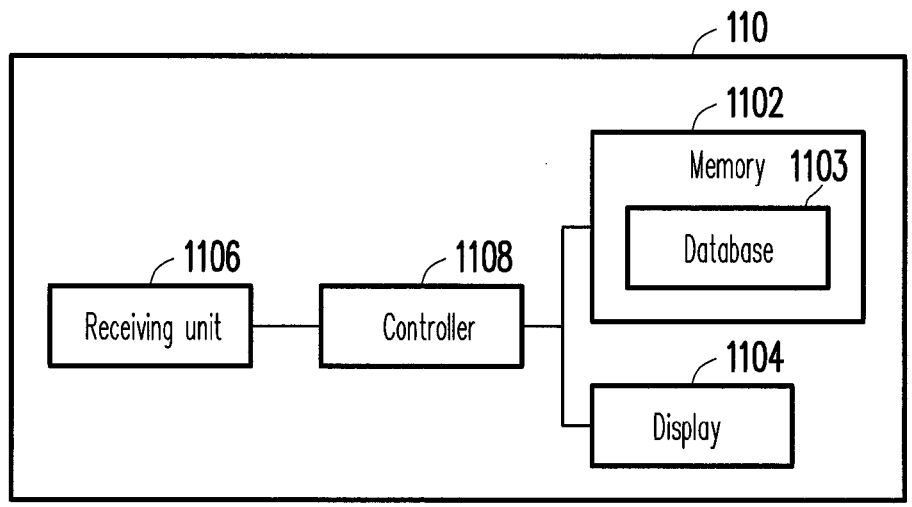
FIG. 1B is a functional block diagram of a display device according to an embodiment of the present invention.

FIG. 1B is a functional block diagram of a display device according to an embodiment of the present invention. In FIG. 1B, the display device 110 includes a memory 1102, a display 1104, a receiving unit 1106 and a controller 1108. The controller 1108 is coupled to the memory 1102, the display 1104 and the receiving unit 1106, and controls and coordinates the memory 1102, the display 1104 and the receiving unit 1106. The memory 1102 is configured for storing virtual keyboard program codes corresponding to the virtual keyboard, and a plurality of words converted from a plurality of characters input by the user. The virtual keyboard program codes are executed by the controller 1108, and the controller 1108 controls the display 1104 to display the virtual keyboard and the cursor remotely controlled and operated by the user through the plurality of direction keys of the remote controller 120 according to the virtual keyboard program codes.

The receiving unit 1106 is configured for receiving a radio frequency (RF) signal or a wireless signal transmitted by the remote controller 120, the controller 1108 converts the RF signal or the wireless signal received by the receiving unit 1106 into cursor movement information and selection information, and provide the cursor movement information and the selection information to the display 1104. Then, the display 1104 displays a corresponding cursor and input words, symbols or numbers corresponding to the selection information. In other words, the receiving unit 1106 receives a plurality of movement commands or selection commands from the remote controller 120, where the movement commands or the selection commands may be converted by the controller 1108 to characters corresponding to the plurality of virtual keys of the current key size configuration model of the virtual keyboard transmitted, when the user operates the remote controller 120 for remote control. Next, the controller 1108 is configured for converting the cursor movement information and the confirmation information received by the receiving unit 1106 into corresponding characters, and converting the characters into words, symbols or numbers, and then storing the words, symbols or numbers in the memory 1102. The controller 1108 is also configured for converting the cursor movement information and the confirmation information into cursors to be displayed on the display 1104, and configured for displaying the virtual keyboard on the display 1104 when executing the virtual keyboard program codes. Additionally, the controller 1108 is further configured for performing one operation or more operations of a preset algorithm module, and configured for generating an optimal key size configuration model of the virtual keyboard.

Figure 1C:
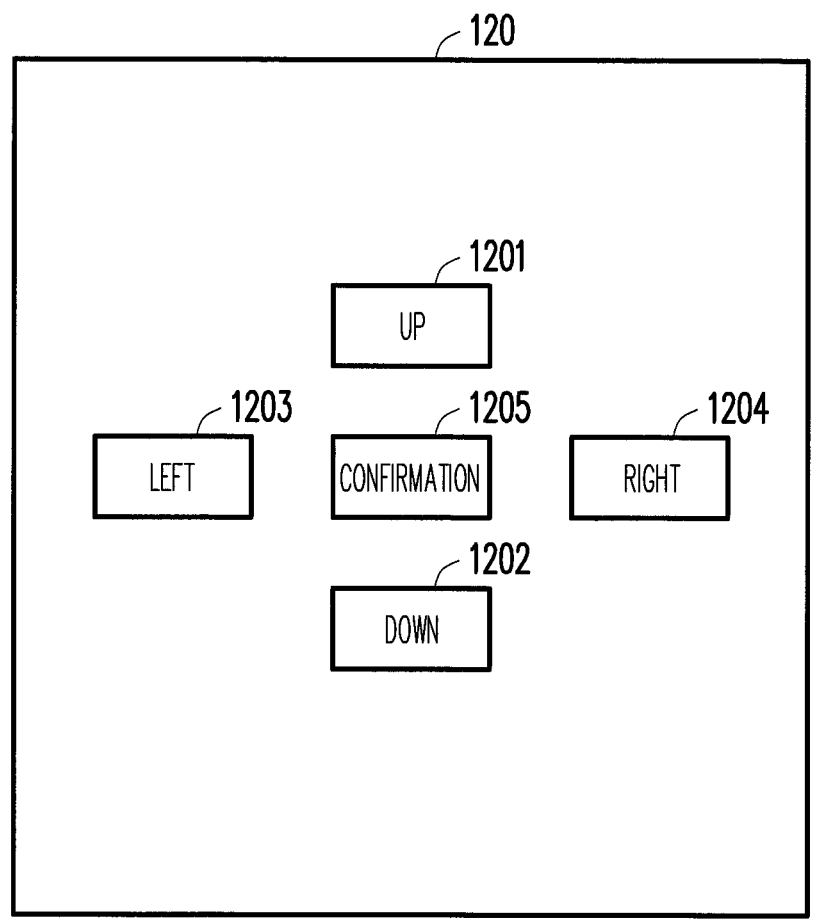
FIG. 1C is an arrangement diagram of keys of a remote controller according to an embodiment of the present invention.

FIG. 1C is a schematic diagram of key arrangement of a remote controller according to an embodiment of the present invention. In FIG. 1C, the remote controller 120 includes an UP button 1201, a DOWN button 1202, a LEFT button 1203, a RIGHT button 1204 and a CONFIRMATION button 1205. When the user presses the "UP button 1201", the remote controller 120 transmits cursor movement information of moving the cursor upward to the display device 110. When the user presses the "DOWN button 1202", the remote controller 120 transmits cursor movement information of moving the cursor downward to the display device 110. When the user presses the "LEFT button 1203", the remote controller 120 transmits cursor movement information of moving the cursor leftward to the display device 110. When the user presses the "RIGHT button 1204", the remote controller 120 transmits cursor movement information of moving the cursor rightward to the display device 110. When the user presses the "CONFIRMATION button 1205", the remote controller 120 transmits confirmation information to the display device 110.

FIG. 2A and FIG. 2B are schematic diagrams of an initial virtual keyboard and states and corresponding horizontal sizes of virtual keys thereof according to an embodiment of the present invention. Referring to FIG. 2A and FIG. 2B at the same time, the virtual keyboard 210 includes a virtual keyboard's first row 2101, a virtual keyboard second's row 2102 and a virtual keyboard's third row 2103. The virtual keyboard 210 also includes 26 virtual keys corresponding from A to Z (for example, letters "M", "N", "P" and "Q" respectively labelled as virtual keys 21001, 21002, 21018 and 21026). In this embodiment, each of the virtual keys may have 4 states (for example, a normal state, a leftward expanding state, a rightward expanding state and a two-side expanding state) and corresponds to a horizontal size. For example, initial states of the virtual keys (for example, merely labelled virtual keys 21001, 21002, 21018 and 21026) in the virtual keyboard 210 are normal states, that is to say, the horizontal sizes of the virtual keys (merely labelled virtual keys 21001, 21002, 21018 and 21026) are of identical normal size.

Figure 3:
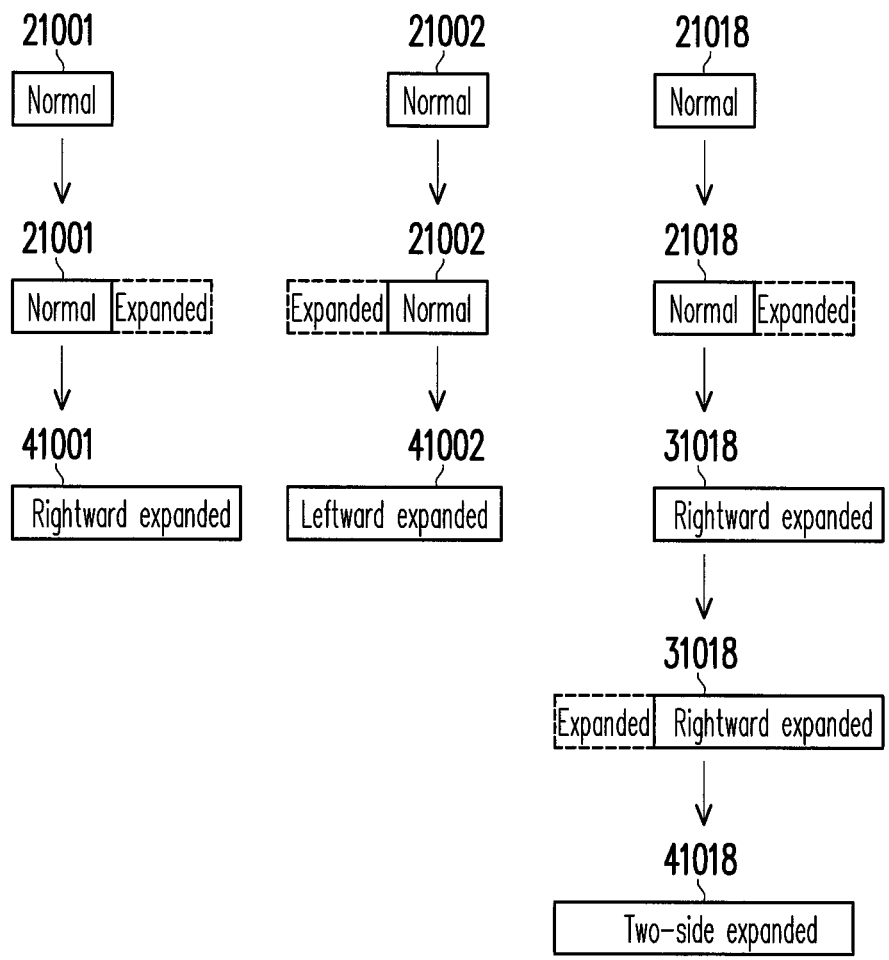
FIG. 3 is a schematic diagram of changes in horizontal sizes of virtual keys according to an embodiment of the present invention.

FIG. 3 is a schematic diagram of changes in horizontal sizes of virtual keys according to an embodiment of the present invention. In FIG. 3, the virtual key 21001 in an initial state of a normal state, after the change of being expanded rightward, is turned into a virtual key 41001 in a rightward expanded state; the virtual key 21002 in an initial state of a normal state, after the change of being expanded leftward, is turned into a virtual key 41002 in a leftward expanded state; and the virtual key 21018 in an initial state of a normal state, after the change of being expanded rightward first, is turned into a virtual key 31018 in a rightward expanded state, then the virtual key 31018 in the rightward expanded state after being further expanded leftward, is turned into a virtual key 41018 in a two-side expanded state.

For example, the rightward expanding range of the virtual key 41001 that is expanded rightward is the horizontal size of a normal virtual key; the leftward expanding range of the virtual key 41002 that is expanded leftward is also the horizontal size of a normal virtual key; and the rightward expanding and leftward expanding ranges of the virtual key 41018 that is expanded to two sides both are the horizontal size of a normal virtual key. In other words, the horizontal sizes of the rightward expanded and leftward expanded virtual keys are the horizontal size of 2 normal virtual keys, and the horizontal sizes of the two-side expanding virtual keys are the horizontal size of 3 normal virtual keys.

In addition, in FIG. 3, when the virtual key 21001 is expanded rightward and is turned into the virtual key 41001, the number of expansion is 1; similarly, when the virtual key 21002 is expanded leftward and is turned into the virtual key 41002, the number of expansion is 1; differently, when the virtual key 21018 is expanded to two sides and is turned into the virtual key 41018, the number of expansion is 2 (firstly being expanded rightward for 1 time, then being expanded leftward for 1 time, and being expanded for 2 times in total).

It is noted that, in an embodiment of the present invention, the virtual keyboard includes 3 rows, which are a first row of the virtual keyboard, a second row of the virtual keyboard and a third row of the virtual keyboard respectively, and a sum of numbers of expansions of the virtual keys in each row are fixed. For example, in an embodiment of the present invention, the virtual keys in each row of the virtual keyboard is preset to be expanded for 4 times, if an upper limit of the number of expansion is reached during the expansion procedure of the virtual keyboard, any one of the virtual keys is forced to stop from being expanded, and the current virtual key program code is directly corresponded to an key size configuration model of the virtual keyboard. That is to say, the display device 110 may obtain the key size configuration model of the virtual keyboard according to the virtual key program code and display a plurality of virtual keys of the key size configuration model.

FIG. 4A and FIG. 4B are schematic diagrams of a virtual keyboard after changes and states and corresponding horizontal sizes of virtual keys thereof according to an embodiment of the present invention. Referring to FIG. 4A and FIG. 4B at the same time, the virtual keyboard 420 in FIG. 4A and the virtual keyboard 430 in FIG. 4B both include 26 virtual keys (for example, letters "G", "M", "N", "O" and "Q" labelled as virtual keys 42001, 42002, 42003, 42004 and 42005). In FIG. 4A, the state of the virtual key 42001 is a two-side expanded state, the state of the virtual key 42003 is a leftward expanded state, the state of the virtual key 42002 is a rightward expanded state, the state of the virtual key 42004 is a two-side expanded state, and the state of the virtual key 42005 is a normal state. In FIG. 4B, the virtual keyboard 430 is recorded through a data structure, where the virtual key 43001 to the virtual key 43005 correspond to the current states of the horizontal sizes of the virtual key 42001 to the virtual key 42005 respectively. The virtual keyboard 430 is stored in the memory 1102.

It is noted that, the present invention is not limited to the manner described previously. In an embodiment of the present invention, the change of the horizontal size of the virtual keyboard may further include reducing from a normal size of the virtual key to a half of the normal size.

Figure 5:
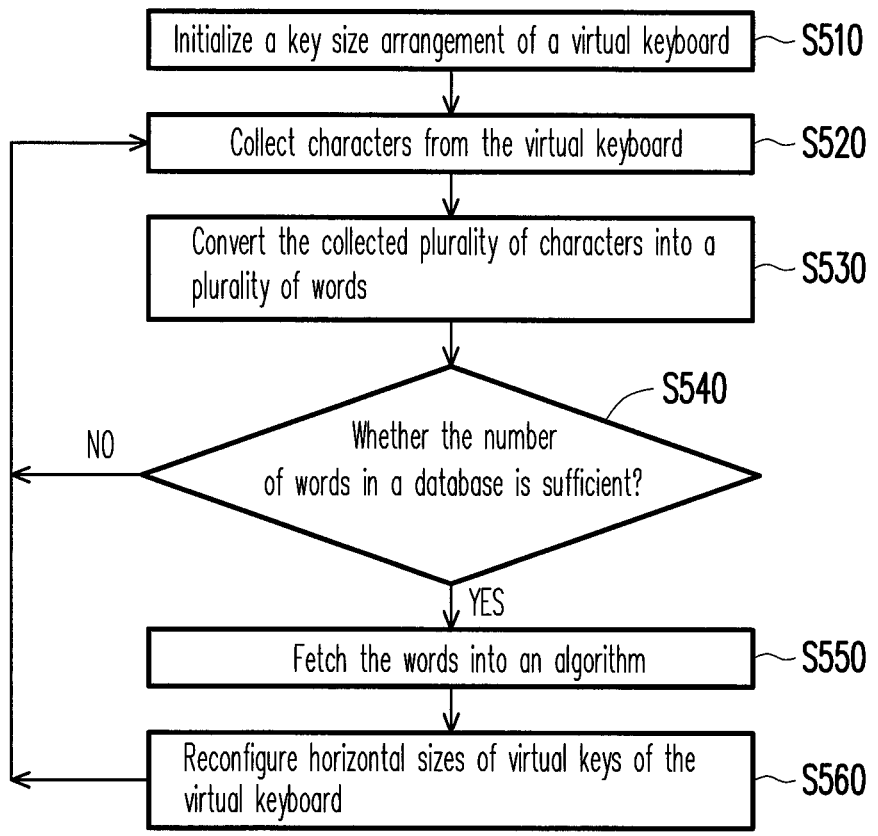
FIG. 5 is a schematic flowchart of a method for adaptively adjusting a size of a virtual keyboard according to an embodiment of the present invention.

FIG. 5 is a flowchart of a method for adaptively adjusting a size of virtual keyboard according to an embodiment of the present invention. Referring to FIG. 1B and FIG. 5 at the same time, the method starts at Step S510. In Step S510, the display 1104 displays a group of initial virtual keyboard program codes (corresponding to an initial key size configuration model or a so-called first key size configuration model of the virtual keyboard) stored in the memory 1102. In other words, in Step 510, the key size configuration of the virtual keyboard is initialized, the key size configuration result is stored in the memory 1102, and the virtual keyboard is displayed by the display 1104.

In Step S520, the controller 1108 collects a plurality of characters from the virtual keyboard. That is, the receiving unit 1106 receives cursor movement information and confirmation information input by a user through the remote controller 120, and the controller 1108 converts the cursor movement information and the confirmation information into a plurality of corresponding characters according to the current virtual keyboard key size configuration model.

In Step S530, the controller 1108 converts the plurality of characters collected in Step S520 into a plurality of words, and stores the words in a database 1103 of the memory 1108.

In Step S540, the controller 1108 determines whether the number of words stored in the memory 1102 is sufficient according to a preset threshold. When the number of the words stored in the memory 1100 is greater than or equal to the preset threshold, Step S550 is performed successively after Step S540; and when the number of the words stored in the memory 1102 is less than the preset threshold, Step S520 is performed successively after Step S540, that is, the cursor movement information and the confirmation information input by the user are continuously received through the remote controller 120.

In Step S550, the controller 1108 fetches (or inputs) the words stored in the memory 1102 to a preset algorithm model for operation, this algorithm model generates an operation result according to the words stored in the memory 1102 and the preset initial virtual keyboard key size configuration model (for example, the first key size configuration model of the virtual keyboard), and the controller 1108 generates a preferred key size configuration model of the virtual keyboard (for example, the second key size configuration model of the virtual keyboard) according to the operation result.

In an embodiment of the present invention, the algorithm model is, for example, a genetic algorithm model (GA model), in which the virtual keyboard may be regarded as a chromosome, and the virtual key size states of the virtual keyboard (for example, various virtual key size states displayed in the virtual keyboard 430 in FIG. 4B: the leftward expanded state, the rightward expanded state, the two-side expanded state and the normal state) may be regarded as genes in the chromosome based on the concept of evolution and eugenic in genetic science. However, the present invention is not limited to the genetic algorithm model described previously, and may also be applicable in any artificial intelligence algorithm models, in which, according to an initialized key size configuration model, a plurality of input characters (or a plurality of converted words) of the user is collected for a preset period of time, and according to a preset artificial intelligence algorithm model, other key size configuration models of the virtual keyboard are obtained, and an optimal key size configuration model is chosen from the other key size configuration models of the virtual keyboard to adjust the horizontal sizes of a part of the virtual keys of the virtual keyboard.

It is noted that, although an embodiment of the present invention uses the genetic algorithm model to perform the optimization operation to generate the optimal virtual keyboard, the present invention is not limited thereto. That is to say, the genetic algorithm is not used to limit the present invention; and all the algorithm models or operation methods that can achieve the same effect still fall within the scope of the present invention.

For example, in an embodiment of the present invention, corresponding to hundreds of types or even thousands of types of changes of the genes (due to inheritance or mutation), each of the virtual keys has 4 states (the normal state, the leftward expanded state, the rightward expanded state and the two-side expanded state) corresponding to the horizontal sizes of the corresponding virtual keys.

In Step S560, the controller 1108 reconfigures the horizontal sizes of a part of the virtual keys or all of the virtual keys in the virtual keyboard according to the preferred key size configuration model of the virtual keyboard (for example, the second key size configuration model of the virtual keyboard) obtained in Step S550. The reconfiguration includes following: adjusting the horizontal sizes of a part of the virtual keys, expanding the horizontal sizes of a part of the virtual keys, and reducing the horizontal sizes of a part of the virtual keys. Step S520 is performed successively after Step S560, and the method for adaptively adjusting the sizes of the virtual keys is completed accordingly.

In addition, in another embodiment, the controller 1108 may further simultaneously set a plurality of candidate models configured in the virtual keyboard in the database of the memory 1102 in Step S530. Moreover, for the candidate models, in Step S550, the controller 1108 may further calculate a total number of movements required to be performed respectively when the user inputs a plurality of fixed words by using the direction keys of the remote controller 120 (after Step S530, the controller 1108 decides which words to be input), and the controller 1108 may select a candidate model having the least number of movements from the candidate models having respectively corresponding total numbers of movements, as the second key size configuration model of the virtual keyboard. Then, in Step S560, according to the second key size configuration model, the controller 1108 adjusts the horizontal sizes of a part of the virtual keys or all of the virtual keys of the virtual keyboard. The step of adjusting the horizontal sizes of a part of the virtual keys of the virtual keyboard includes following: expanding the horizontal sizes of a part of the virtual keys and reducing the horizontal sizes of a part of the virtual keys.

In another embodiment, the controller 1108 may firstly generate a plurality of candidate models (respectively corresponding to the plurality of key size configuration models of the virtual keyboard) in Step S530, and the candidate models all have identical number of variables respectively corresponding to the plurality of virtual keys. Then, for the candidate models, the controller 1108 calculates a plurality of numbers of movements required to be performed when the user inputs each word of the plurality of words respectively, which are determined to be input by the controller 1108 after Step S530, by using the plurality of direction keys of the remote controller 120, and adds up the numbers of movements as a fitness function operation result. Next, the controller 1108 sorts the candidate models in a descending order according to the fitness function operation results of the candidate models, and selects one of the candidate models as the second key size configuration model of the virtual keyboard according to the sorting order of the candidate models.

Figure 6:
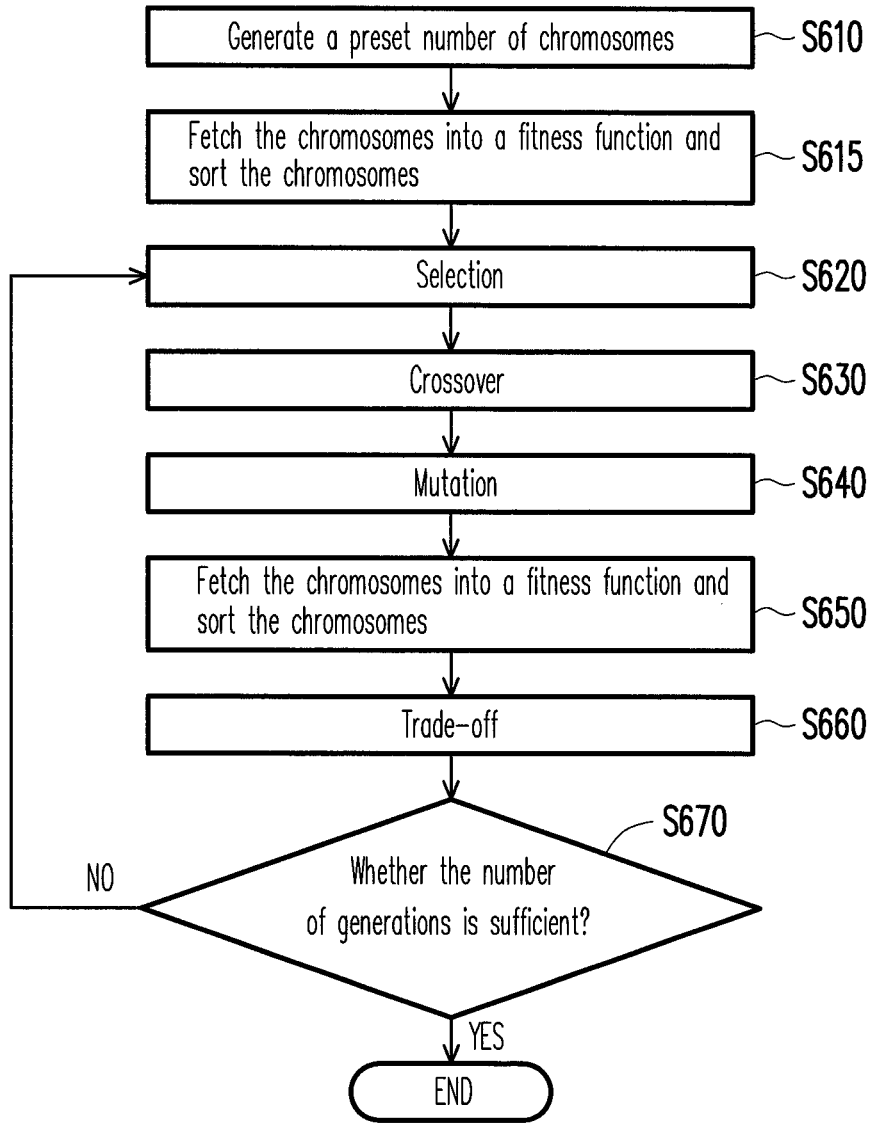
FIG. 6 is a schematic diagram of an operation process of a genetic algorithm module according to an embodiment of the present invention.

FIG. 6 is a flowchart of the genetic algorithm module according to an embodiment of the present invention. Referring to FIG. 6, in this embodiment, when performing the following operations, based on the concept of genetic algorithm, the virtual keyboard may be corresponding to the chromosome, and each of the virtual keys of the virtual keyboard may be corresponding to a plurality of genes in the chromosome respectively.

In FIG. 6, the method starts at Step S610, in Step S610, the initial step of the genetic algorithm is randomly generating a preset number of chromosomes (for example, 200 chromosomes or 300 chromosomes) as parent chromosomes, herein the chromosomes may be called as candidate models. Each of the parent chromosomes (corresponding to a parent candidate model) has various gene combinations generated randomly, and each of the chromosomes has the same number of a plurality of genes corresponding to a plurality of variable items, and the variables further correspond to all the plurality of virtual keys of the key size configuration model of the parent candidate model respectively. In the present embodiment, the controller 1108 may randomly generate 200 groups of key size configuration models of virtual keyboard (i.e., the parent candidate models of the virtual keyboard) including virtual keys in 4 states, and store the key size configuration models of the virtual keyboard in the memory 1102.

It is noted that, the present invention is not limited to the manner described previously. In another embodiment of the present invention, the initial 200 groups of virtual keys may be obtained from the Internet, and have a certain special relation with the user. For example, the virtual key groups frequently used by the users are classified according to the occupations of the plurality of users. For example, if the occupation of a user is a teacher, the controller 1108 may download 200 groups of virtual key groups which are frequently used by teachers as the initial virtual keys of the plurality of groups of parent chromosomes, and so forth.

Step S615 is performed after Step S610, to respectively fetch a preset number of key size configuration models of the virtual keyboards that are randomly generated in Step S610 into the fitness function, and to sort the key size configuration models according to the function calculation result. Herein, in Step S615, the randomly generated parent candidate models are fetched into the fitness function respectively, and the parent candidate models are sorted according to the function calculation result.

In Step S620, a selection process is performed to select a parent candidate model and allocates the parent candidate model in a mating pool, that is, the probability of the chromosome being selected is determined by the fitness function value of the chromosome, and 2 chromosomes (corresponding to the parent candidate models) are selected from the parent chromosomes as a basis for subsequently generating 2 child chromosomes (or called as child candidate models). Three methods, namely, roulette wheel selection, tournament selection and rank based wheel selection, are commonly used. The same as the parent chromosomes, each of the child chromosomes have identical number of genes respectively corresponding to the variables, and the variables further correspond to all the plurality of virtual keys of the key size configuration model of the child candidate model. In the present embodiment, the controller 1108 may randomly select 2 (for example, the first key size configuration model and the second key size configuration model of the virtual keyboard) from the plurality of key size configuration models of the virtual keyboard stored in the memory 1102 as the basis for generating the child chromosomes (that is, the child candidate models of the virtual keyboard).

It is noted that, the present embodiment merely uses the first key size configuration model and the second key size configuration model as examples to explain the operation method of the genetic algorithm model. In fact, apart from the first key size configuration model and the second key size configuration model, the rest of 198 virtual keyboard program codes stored in the memory 1102 may be chosen randomly in pairs and be used to perform the operations of the genetic algorithm model.

In Step S630, a crossover process is performed by the chromosomes, that is, 2 parent chromosomes are used to perform gene segment exchange, to generate a child chromosome. In the present embodiment, the controller 1108 controls the first key size configuration model and the second key size configuration model chosen in Step S620 to perform the crossover process and to generate a third key size configuration model of the virtual keyboard.

First, a plurality of groups of configuration models of virtual keyboards stored in the memory 1102 are preset, for example, the group magnitude is set to be 200 groups, so that 200 groups of configuration models may be generated initially. After the crossover process, the child group magnitude still maintains 200 groups. 100 groups of the child groups are left after trade-off (elite reservation), after being replicated through a selection procedure in Step S620, the parent group mating pool still maintains 200 groups, and after the crossover process, the child group still maintains 200 groups.

In Step S640, according to the genetic algorithm rule, the genes in the parent chromosomes may be mutated under certain probability (which is extremely small usually), and the child chromosomes may be generated after mutation. In the present embodiment, the controller 1108 determines whether the mutation process needs to be performed on the first key size configuration model, the second key size configuration model and the third key size configuration model generated in Step S630 according to a preset mutation incidence probability (for example, $0.001 < P < 0.002$).

Step S640 is more specifically illustrated as follows. After the controller 1108 obtains the first key size configuration model, the second key size configuration model and the third key size configuration model generated in Step S630, the controller 1108 randomly generates 3 probabilities P1, P2 and P3, where P1 is assigned to the first key size configuration model; P2 is assigned to the second key size configuration model; and P3 is assigned to the third key size configuration model.

Then, the controller 1108 compares whether P1, P2 or P3 is less than the mutation occurring ratio (P) respectively, when P1 is less than P, the mutation process is performed on the first key size configuration model, and a fourth key size configuration model is generated; similarly, when P2 or P3 is less than P, the mutation process is performed on the second or the third key size configuration model respectively, and a fifth or a sixth key size configuration model is generated respectively; then, the controller 1108 stores the plurality of generated key size configuration models in the memory 1102 as the plurality of corresponding child chromosomes.

It is noted that, in the present embodiment, the mutation process of the chromosomes of the key size configuration models is respectively independent from each other and does not interfere with each other.

In Step S650, the fitness function operation process is performed, that is, the child chromosomes generated by Steps S610-S640 are fetched into the preset fitness function respectively for operation, and operation results are generated respectively, then fitness values of the child chromosomes are generated according to the operation results respectively.

In the present embodiment, the controller 1108 obtains all the stored plurality of words from the memory 1102 and all the plurality of key size configuration models of the virtual keyboard (that is, all the candidate models of the virtual keyboard) generated by the Steps S610-S640, and performs the fitness function operation process. In addition, the operation results of the fitness function of the key size configuration models of the virtual keyboards are stored in the memory 1102. For example, the controller 1108 obtains all the stored words and the first, the second, the third, the fourth, the fifth or the sixth key size configuration model generated in the steps S610-S640 from the memory 1102, the generates a first fitness value (V1) corresponding to the first key size configuration model, a second fitness value (V2) corresponding to the second key size configuration model, a third fitness value (V3) corresponding to the third key size configuration model, a fourth fitness value (V4) corresponding to the fourth key size configuration model, a fifth fitness value (V5) corresponding to the fifth key size configuration model or the sixth fitness value (V6) corresponding to the sixth key size configuration model through fitness function operation.

In addition, in the present embodiment, the operation manner of the fitness function may be described as following: the controller 1108 imitates actions of inputting characters using the remote controller 120 by the user, and calculates a sum of numbers of movements of cursor required for inputting the plurality of words (for example, 200 words that are most frequently input) stored in the memory 1102 according to the virtual keyboards respectively corresponding to the first, the second, the third, the fourth, the fifth or the sixth key size configuration model, then generates a plurality of fitness values (or the operation results of the fitness function) corresponding to the first, the second, the third, the fourth, the fifth or the sixth key size configuration model according to the sum of the numbers of movements.

Next, the controller 1108 may further sort all the chromosomes in the memory 1102 in an ascending order according to the corresponding fitness values.

In Step S660, the controller 1108 performs a trade-off process, that is, to trade off the a plurality of child chromosomes multiplied in Steps S610-S650 by using the principle of proportionality (the population having a low fitness to the environment will naturally be eliminated by the environment, while the population having a high fitness to the environment will remain naturally, and the remaining population may further multiply the next generation).

In the present embodiment, since 200 groups of key size configuration models are stored in the memory 1102 in Step S610, 200 groups of key size configuration models still remain after Step S630. Therefore, in Step S660, 200 groups of key size configuration models that have been sorted are still in the memory 1102. Then, the controller 1108 selects top 100 groups of key size configuration models that have small fitness values (top 100 groups sorted in an ascending order), and deletes the rest 100 groups of key size configuration models that are not chosen (meaning that the sum of the numbers of movements are too large to be the optimal key size configuration models of the virtual keyboard). The elite reservation is used in the present embodiment, and the top 100 groups of the key size configuration models of corresponding less fitness values are the preset screening conditions for trading off in Step S660, so as to ensure that the fitness function value of the new generation will not be reduced.

It is noted that, in Step S660, the trade-off method is not limited to the elite reservation. Integrated generation replacement is another common method, that is, an old generation of a whole group is replaced with a new generation of a whole group to be a new group. In other words, in another embodiment of the present invention, the controller 1108, according to a preset screening condition, for example, the fitness standard value (V), trades off all the fitness values and the corresponding virtual keyboard program codes stored in the memory 1102. That is to say, the controller 1108 deletes all the virtual keyboard program codes of which the fitness values are greater than or equal to V in the memory 1102, and merely reserves the virtual keyboard program codes of which the fitness values are less than V in the memory 1102. Apart from the methods described previously, in another embodiment of the present invention, the trade-off method may further include fitness value trade-off methods using roulette wheel selection, tournament selection or rank based wheel selection.

In Step S670, it is determined whether the number of generations is sufficient or whether more generations of the virtual keyboard needs to be generated to continue the change of multiplication, so as to obtain the optimal key size configuration model of the virtual keyboard.

In the present embodiment, the controller 1108, according to the preset operation threshold, determines whether to stop performing the genetic algorithm module operation process. When Steps S620-S660 of performing the genetic algorithm module repeatedly reach a generation threshold (for example, 50 times), the controller 1108 terminates the current genetic algorithm module operation process; when the number of performing does not reach the generation threshold, Steps S620-S660 of performing the genetic algorithm module are repeated, so as to obtain an optimal key size configuration model of the virtual keyboard (for example, the second candidate model). The operation threshold in Step S670 may be called as an iteration operation threshold.

It is noted that, although the operation threshold is used as the operation termination condition of the genetic algorithm module in this embodiment, the present invention is not limited thereto, that is to say, the termination condition is not used to limit the present invention, and any method for determining the time for termination that can achieve the same effect fall within in the scope of present invention.

For example, in another embodiment of the present invention, the controller 1108, according to the difference between the maximal fitness value and the minimal fitness value of the 100 groups of fitness values stored in the memory 1102 in Step S660, determines whether to terminate the current operation process of the genetic algorithm module. First, the controller 1108 compares the maximal fitness value and the minimal fitness value of the 100 groups of fitness values stored in the memory 1102, and generates a determination result.

In view of the aforementioned description, when the determination result is that the maximal fitness value is extremely close to the minimal fitness value (or the maximal fitness value is identical with the minimal fitness value), the controller 1108 terminates the current operation process of the genetic algorithm module, and outputs the optimal key size configuration model (for example, the second candidate model) of the virtual keyboard corresponding to the minimal fitness value. The genetic algorithm module operation method is completed accordingly. When the determination result is that the maximal fitness value is far away from the minimal fitness value (or the maximal fitness value is different from the minimal fitness value), Step S620-Step S660 are performed successively after step 670 since the optimal key size configuration model of the virtual keyboard is not found.

It is noted that, when Step S620 is performed successively after Step S670, in Step S620, the preset key size configuration model of the virtual keyboard is changed into the 100 groups of preferred key size configuration model of the virtual keyboard stored in the memory 1102 in Step S660.

In addition, in another embodiment of the present invention, the termination condition may further be the following similar concepts: when the system resource consumed reaches a preset value; when a child chromosome satisfies the optimized fitness value condition; or the termination condition may be when the fitness has been saturated, and no child chromosome of better fitness will be generated through continuous evolution. Therefore, if the current operation result of the genetic algorithm module satisfies the one or multiple decision-making condition, the current operation process is terminated. After Step S670, the operation method of the genetic algorithm model of this embodiment is finished accordingly.

Figure 7A:
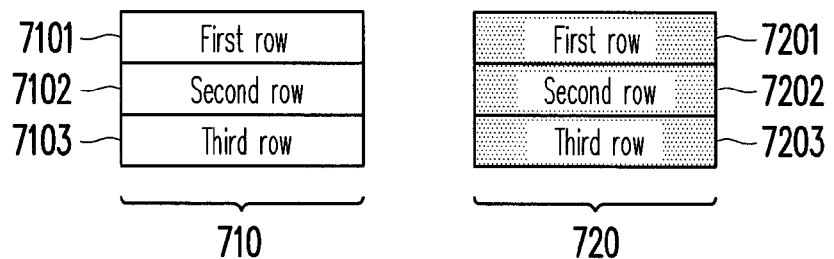
FIG. 7A, FIG. 7B and FIG. 7C are schematic diagrams of a crossover process according to an embodiment of the present invention.
Figure 7B:
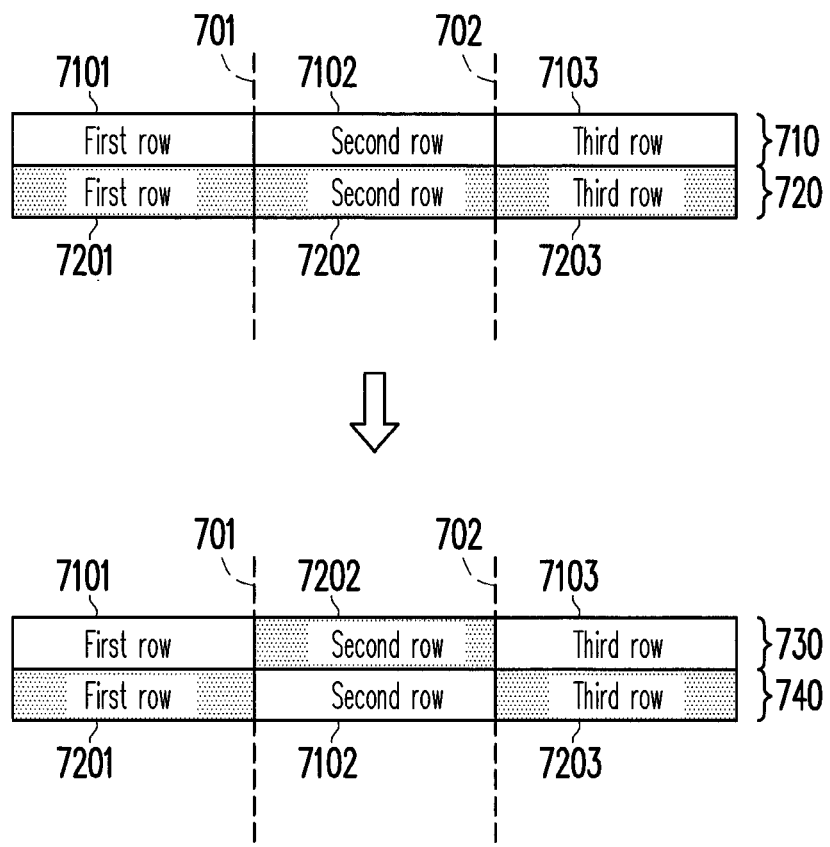
Figure 7C:
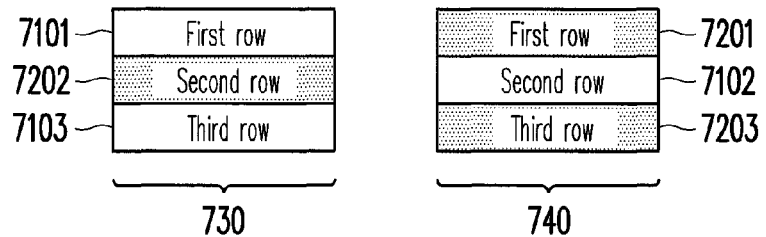

FIG. 7A, FIG. 7B and FIG. 7C are schematic diagrams of a crossover process according to an embodiment of the present invention. Refer to FIG. 7A, FIG. 7B and FIG. 7C at the same time, in FIG. 7A, a first virtual keyboard 710 includes a virtual keyboard's first row 7101, a virtual keyboard's second row 7102 and a virtual keyboard's row 7103 of the first virtual keyboard. A second virtual keyboard 720 includes a virtual keyboard's first row 7201, a virtual keyboard's second row 7202 and a virtual keyboard's third row 7203 of the second virtual keyboard.

It is noted that, in the present embodiment, the virtual keyboard's first row 7101, the virtual keyboard's second row 7102, the virtual keyboard's third row 7103 and the other 3 rows of the virtual keyboard mentioned previously, are all similar to the virtual keyboard first row 2101, the virtual keyboard's second row 2102 and the virtual keyboard's third row 2103 in FIG. 2A.

According to FIG. 7B and FIG. 7C, in the present exemplary embodiment, when the first virtual keyboard 710 and the second virtual keyboard 720 perform the crossover process, a first crossover point 701 and a second crossover point 702 are determined at first, and then, between the first crossover point 701 and the second crossover point 702, the first virtual keyboard's second row 7102 and the second virtual keyboard 720's second row 7202 are exchanged. Apart from the actions mentioned previously, the first virtual keyboard first row 7101, the first virtual keyboard's third row 7103, the second virtual keyboard's first row 7201 and the second virtual keyboard's third row 7203 all do not act.

In view of the aforementioned description, after the crossover process between the first virtual keyboard 710 and the second virtual keyboard 720 is completed, the third virtual keyboard 730 and the fourth virtual keyboard 740 are obtained. For example, the third virtual keyboard 730 includes the virtual keyboard's first row 7101 of the first virtual keyboard, the virtual keyboard's second row 7202 of the second virtual keyboard and the virtual keyboard's third row 7103 of the first virtual keyboard. The fourth virtual keyboard 740 includes the virtual keyboard's first row 7201 of the second virtual keyboard, the virtual keyboard's second row 7102 of the first virtual keyboard and the virtual keyboard's third row 7203 of the second virtual keyboard.

Finally, one of the third virtual keyboard 730 and the fourth virtual keyboard 740 is randomly selected, and the arrangement of corresponding virtual keyboard is stored in the memory 1102.

It is noted that, the crossover process is not used to limit the present invention, other method of performing the crossover process may also be used, and the present invention is not limited thereto.

Figure 8:
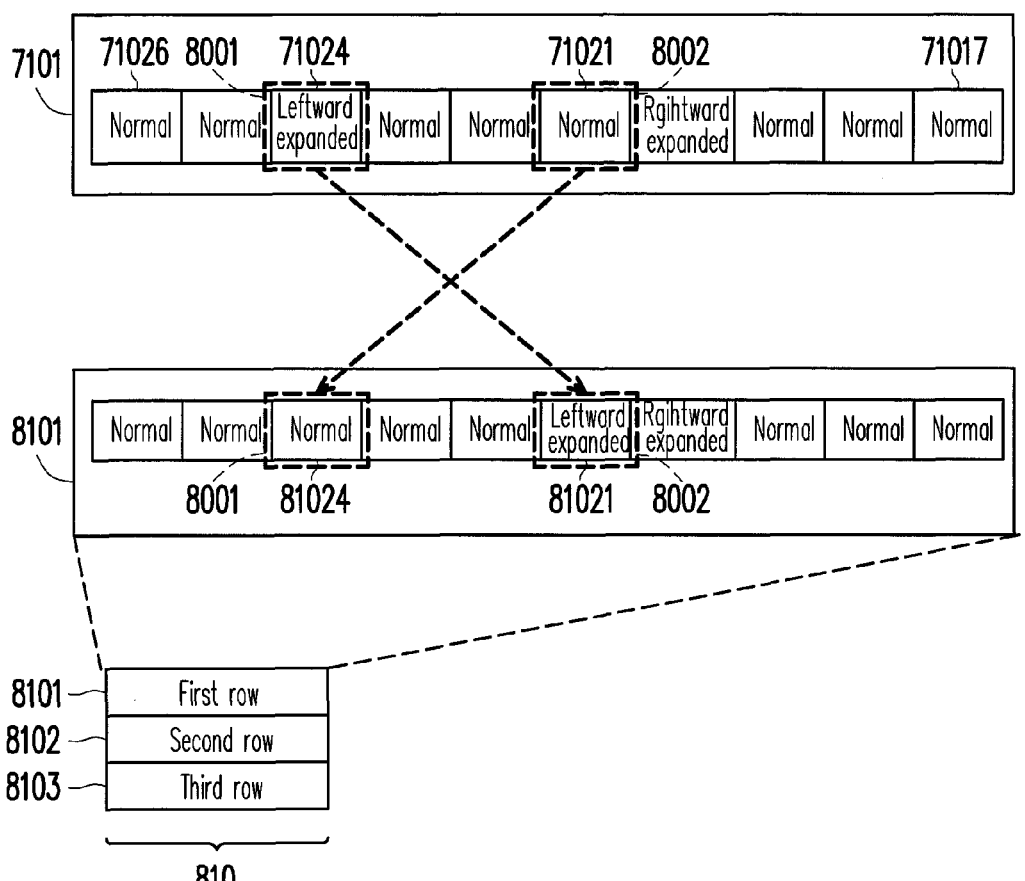
FIG. 8 is a schematic diagram of a mutation process according to an embodiment of the present invention.

FIG. 8 is a schematic diagram of a mutation process according to an embodiment of the present invention. In FIG. 8, the third virtual keyboard's first row 7101 includes 10 virtual keys (merely the virtual keys 71017, 71021, 71024 and 71026 are shown). A method of the mutation process will be described in detail with reference to FIG. 7C and FIG. 8 at the same time.

In the present embodiment, the method of the mutation process may be following: firstly, the controller 1108 chooses a row to be mutated (for example, the third virtual keyboard's first row 7101), and randomly chooses 2 numbers (2 numbers out of 1-10, for example, 3 and 6) according to the length of the row to be mutated (that is, the length of the 10 virtual keys); corresponds the chosen 2 numbers (3 and 6) to the 2 exchange positions (corresponding 3 to a first exchange position 8001 and corresponding 6 to a second exchange position 8002); and then, exchanges the virtual keys (virtual keys 71021 and 71024) at the 2 exchange positions, so as to generate a new virtual key arrangement combination (the virtual keyboard's first tow 8101 of the sixth virtual keyboard). Therefore, the difference between the virtual keyboard's first row 8101 of the sixth virtual keyboard and the virtual keyboard's first row 7101 of the third virtual keyboard merely lies in that the virtual key 71024 is changed into the virtual key 81024 at the first exchange position 8001 and the virtual key 71021 is changed into the virtual key 81021 at the second exchange position 8002.

It is noted that, the other 2 rows (the virtual keyboard's second row 7202 of the third virtual keyboard and the virtual keyboard's third row 7103 of the third virtual keyboard) of the virtual keyboard (the third virtual keyboard 710) that perform the mutation process both perform the mutation processes which are independent from each other and do not interfere with each other respectively, and generate new virtual key arrangement combinations (the virtual keyboard's second row 8102 of the sixth virtual keyboard and the virtual keyboard's third row 8103 of the sixth virtual keyboard). Finally, the 3 rows obtained after mutation are combined into a new virtual keyboard (the sixth virtual keyboard 810).

It is noted that, the mutation process is not used to limit the present invention, other methods of performing the mutation process may also be used, and the present invention is not limited Thereto.

Figure 9:
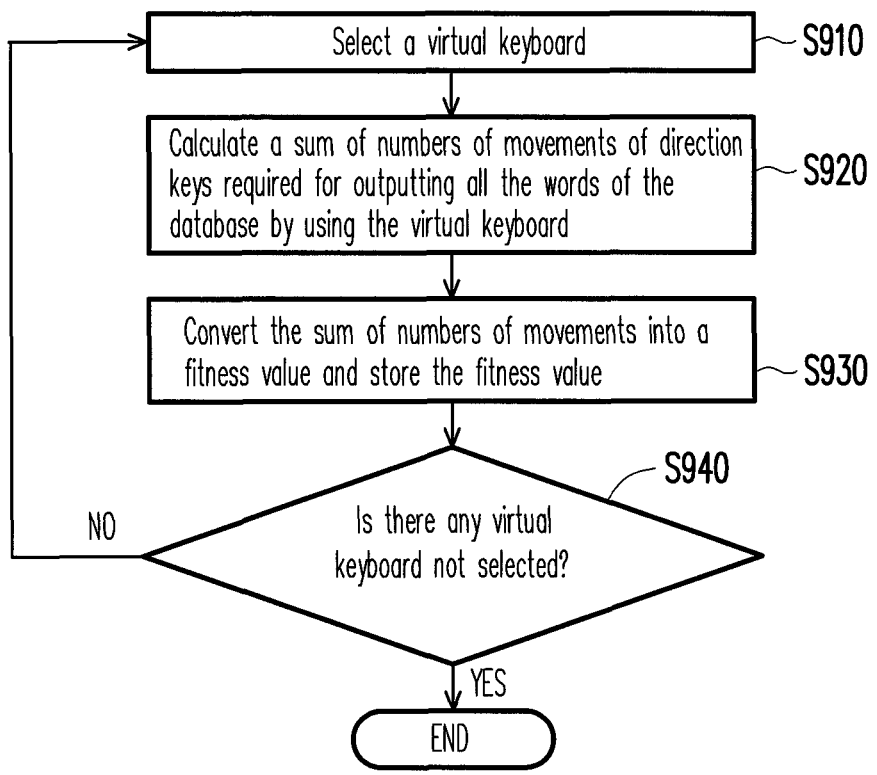
FIG. 9 is a schematic diagram of a fitness function operation process according to an embodiment of the present invention.

FIG. 9 is a flowchart of a fitness function operation process according to an embodiment of the present invention. Referring to FIG. 9, in Step S910, the controller 1108 selects a virtual keyboard program code stored in the memory 1102, and converts the virtual keyboard program code into a key size configuration model of the virtual keyboard.

In Step S920, the controller 1108 imitates process of inputting characters through the remote controller 120 by the user, so as to input a plurality of characteristics forming all the words in the memory 1102 according to the key size configuration model of the virtual keyboard in Step S910, and to calculate a sum of numbers of movements of the cursor needing for inputting the characters.

In Step S930, the controller 1108 converts the sum of numbers of movements into a fitness value, and stores the fitness value in the memory 1102. For example, in the present embodiment, the fitness value is the sum of numbers of movements of the cursor, that is to say, the sum of numbers of movements of the cursor is directly set as the fitness value. It is noted that, the present invention is not limited thereto. Then, the controller 1108 stores the fitness value into the memory 1102.

In Step S940, the controller 1108 determines whether there is a key size configuration model of the virtual keyboard that is not chosen and of which the total number of movements of the cursor is not calculated through Steps S910-S930. When it is determined that there is a key size configuration model of the virtual keyboard that is not chosen, Step S910 is performed successively after Step S940, that is, the key size configuration model of the virtual keyboard is selected and Steps S910-S930 are performed; and when there is no key size configuration model of the virtual keyboard that is not chosen and of which the total number of movements of cursor is not calculated through Steps S910-S930, the fitness function operation process is completed after Step S940.

The calculation method of the sum of numbers of movements of the cursor may be described with reference to a virtual keyboard 1010 and a virtual keyboard 1020 in FIG. 10, and the calculation method is illustrated by simulating the sum of numbers of movements of the cursor when the user inputs exemplary words "google" and "amtran".

Figure 10:
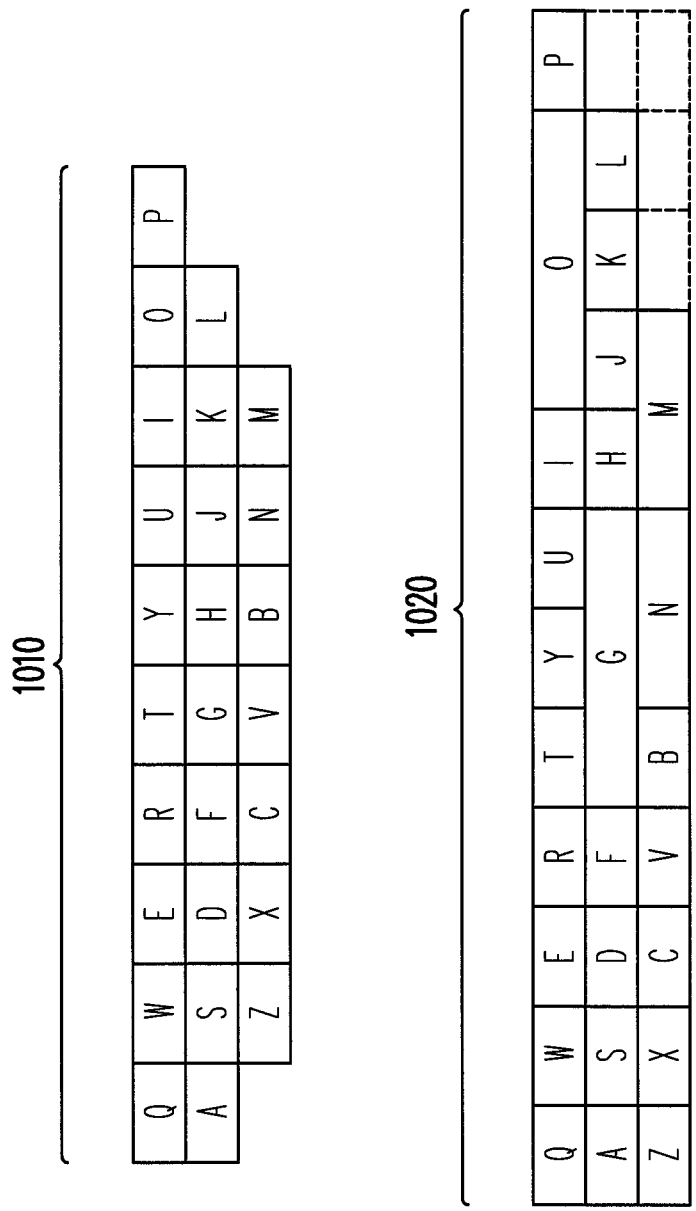
FIG. 10 is a schematic diagram of an initial virtual keyboard and a virtual keyboard adjusted by a method for adaptively adjusting sizes of virtual keys according to an embodiment of the present invention.

FIG. 10 is a schematic diagram of an initial virtual keyboard and a virtual keyboard adjusted by a method for adaptively adjusting sizes of virtual keys according to an embodiment of the present invention. Table 1 below is a statistical table of numbers of movements of the cursor needing for simulating the virtual keyboard 1010 and the virtual keyboard 1020 inputting "google". Table 2 below is a statistical table of numbers of movements of the cursor needing for simulating the virtual keyboard 1010 and the virtual keyboard 1020 inputting "amtran". Refer to FIG. 10, table 1 and table 2 at the same time, the process of adjusting sizes of virtual keys will be described below.

TABLE 1

| Virtual keyboard | g->o | o->o | o->g | g->l | l->e | Number of movements |
|---|---|---|---|---|---|---|
| Virtual keyboard 1010 | 5 | 0 | 5 | 4 | 7 | 21 |
| Virtual keyboard 1020 | 4 | 0 | 4 | 4 | 7 | 19 |

TABLE 2

| Virtual keyboard | a->m | m->t | t->r | r->a | a->n | Number of movements |
|---|---|---|---|---|---|---|
| Virtual keyboard 1010 | 8 | 5 | 1 | 4 | 7 | 25 |
| Virtual keyboard 1020 | 6 | 3 | 1 | 4 | 5 | 19 |

According to Table 1, "g→o" represents that when moving the cursor from "g" to "o" through the virtual keyboard 1010 by using the remote controller 120, the user needs to move the cursor upward for 1 time and rightward for 4 times, thereby moving the cursor totally for 5 times; on the other hand, when moving the cursor from "g" to "o" through the virtual keyboard 1020, the user merely needs to move the cursor upward for 1 time and rightward for 3 times, thereby moving the cursor for 4 times. Therefore, compared with the virtual keyboard 1010, the number of movements of the cursor for inputting "g" and "o" through the virtual keyboard 1020 is 1 time fewer. It does not need to move the cursor when moving from "o" to "o", so the number of movements of the cursor through the virtual keyboard 1010 and the virtual keyboard 1020 are both 0; and the rest processes for selecting other characters are the same, so details are not repeated herein.

According to Table 1 and Table 2, when using the virtual keyboard 1010, it needs to move the cursor for 21 times to input "google", and needs to move the cursor for 25 times to input "amtran", so the sum of numbers of movements of the cursor are 46 times; when using the virtual keyboard 1020, it needs to move the cursor for 19 times to input "google", and needs to move the cursor for 19 times to input "amtran", so the sum of number of movements are 38 times.

In other words, the sum of numbers of movements of the cursor for inputting "google" and "amtran" by using the virtual keyboard 1010 are 46 times; the sum of numbers of movements of the cursor for inputting "google" and "amtran" by using the virtual keyboard 1020 are 38 times, the sum of numbers of movements of the cursor is 8 times fewer than that by using the virtual keyboard 1010, and the time consumed when using the remote controller 120 to choose characters forming the two words is reduced. For example, according to the imitating manner, the fitness value of the key size configuration model of the virtual keyboard 1010 is calculated to be 46 times, while the fitness value of the key size configuration model of the virtual keyboard 1020 is calculated to be 38 times. Then, according to the fitness values of the key size configuration models of the virtual keyboard 1010 and the virtual keyboard 1020 in Step S940, the virtual keyboard 1020 may be selected as a preferred key size configuration model of the virtual keyboard, or the virtual keyboard 1020 may be sorted before the virtual keyboard 1010 in Step S660.

In summary, the present invention provides a method for adaptively adjusting sizes of virtual keys and a display device using the same. A plurality of words that the user has input is collected, and the words are input to the preset algorithm module for an operation, so as to obtain the preferred size of each virtual key in the virtual keyboard, thereby achieving the effect that the user can rapidly input a plurality of characters forming each word.

Although the present invention is disclosed with reference to embodiments above, the embodiments are not intended to limit the present invention. Various variations and modifications can be made by persons skilled in the art without departing from the spirit and the scope of the present invention, so the protection scope of the present invention should be subject to what is defined in appended claims.

What is claimed is:

1. A method for adaptively adjusting sizes of virtual keys, adapted to a display device capable of displaying a virtual keyboard, wherein the virtual keyboard is arranged with a plurality of virtual keys that can be chosen remotely by a plurality of direction keys of a remote controller, the method comprising:

receiving a plurality of characters corresponding to a plurality of virtual keys of a first key size configuration model of the virtual keyboard transmitted by the remote controller;

converting the characters into a plurality of words;

calculating a plurality of numbers of movements required to be performed to input the words by using the direction keys of the remote controller respectively in order to generate a second key size configuration model of the virtual keyboard; and adjusting horizontal sizes of at least a part of the virtual keys of the virtual keyboard according to the second key size configuration model.

2. The method according to claim 1, wherein the step of calculating the numbers of movements required to be performed to input the words by using the direction keys of the remote controller respectively in order to generate the second key size configuration model comprises:

generating a plurality of candidate models, wherein the candidate models have identical number of variables respectively corresponding to the virtual keys;

for the candidate models, calculating the numbers of movements required to be performed to input each word of the words by using the direction keys of the remote controller respectively, and adding up the numbers of movements as a fitness function operation result;

sorting the candidate models in a descending order according to the fitness function operation results of the candidate models; and selecting one of the candidate models as the second key size configuration model according to the sorting order of the candidate models.

3. The method according to claim 2, wherein the step of calculating the number of movements required to be performed to input each word of the words by using the direction keys of the remote controller respectively and adding up the numbers of movements as the fitness function operation result comprises:

selecting one of the candidate models, calculating the number of movements required to be performed to input each word of the words by using the direction keys of the remote controller respectively as the number of movements of the word; and adding up the numbers of a plurality of movements of the words as the fitness function operation result of the selected candidate model.

4. The method according to claim 2, wherein the step of selecting one of the candidate models as the second key size configuration model according to the sorting order of the candidate models comprises:

selecting a candidate model having a minimal fitness function operation result from the candidate models as the second key size configuration model.

5. The method according to claim 1, wherein the step of adjusting the horizontal sizes of a part of the virtual keys of the virtual keyboard comprises:

in at least one row of the virtual keyboard, expanding at least one key in the row to at least one direction of right or left.

6. The method according to claim 1, wherein the step of adjusting the horizontal sizes of a part of the virtual keys of the virtual keyboard comprises:
in at least one row of the virtual keyboard, stopping expanding the rest of keys in the row in the direction of right or left when a total number of the expanded part of virtual keys reaches a preset threshold.

7. The method according to claim 1, wherein the step of calculating the numbers of movements required to be performed to input the words by using the direction keys of the remote controller respectively in order to generate the second key size configuration model comprises:
a. generating a plurality of candidate models randomly;
b. with the candidate models as a plurality of parent candidate models, generating a plurality of child candidate models through crossover and mutation, wherein each of the candidate models has a plurality of genes respectively corresponding to a plurality of variables;
c. based on all the obtained child candidate models, calculating information of the number of movements required to be performed to input each word of the words by using the direction keys of the remote controller respectively, and adding up the information of the number of movements as the fitness function operation result;
d. sorting all the candidate models according to the fitness function operation results of all the candidate models obtained in the step (c);
e. among all the candidate models, reserving a part of candidate models of which the corresponding fitness function operation results satisfy a preset screening condition as a plurality of parent candidate models for a next operation cycle; and
f. repeating the step (a) to the step (e) until a number of iteration operations performed by using the preset algorithm reaches an iteration operation threshold, and selecting a candidate model having a minimum fitness function operation result from the currently reserved parent candidate models as the second key size configuration model.

8. A method for adaptively adjusting sizes of virtual keys, adapted to a display device capable of displaying a virtual keyboard, wherein the virtual keyboard is arranged with a plurality of virtual keys that can be chosen correspondingly and remotely by a plurality of direction keys of a remote controller, the method comprising:
receiving a plurality of characters corresponding to a plurality of virtual keys of a first key size configuration model of the virtual keyboard transmitted by the remote controller;
converting the characters into a plurality of words;
setting a plurality of candidate models arranged for the virtual keyboard;
based on the candidate modules, calculating a total number of movements required to be performed to input the words by using the direction keys of the remote controller respectively;
selecting a candidate model having a minimum total number of movements from the candidate models as a second key size configuration model of the virtual keyboard; and
adjusting horizontal sizes of at least a part of the virtual keys of the virtual keyboard according to the second key size configuration model.

9. The method according to claim 8, wherein the step of adjusting the horizontal sizes of a part of the virtual keys of the virtual keyboard comprises:
in at least one row of the virtual keyboard, expanding at least one key in the row in at least one direction of right or left.

10. The method according to claim 8, wherein the step of adjusting the horizontal sizes of a part of the virtual keys of the virtual keyboard comprises:
in at least one row of the virtual keyboard, stopping expanding the rest keys in the row in the direction of right or left when a total number of the expanded part of virtual keys reaches a preset threshold.

11. A display device, capable of being controlled by a remote controller, the display device comprising:
a memory, configured for storing program codes corresponding to a virtual keyboard, wherein the virtual keyboard is arranged with a plurality of virtual keys capable of being chosen remotely by a plurality of direction keys of the remote controller;
a display, connected to the memory, configured for displaying the virtual keyboard;
a receiving unit, configured for receiving a plurality of characters corresponding to the a plurality of virtual keys of a first key size configuration model of the virtual keyboard transmitted by the remote controller; and
a controller, connected to the receiving unit, the memory and the display, configured for converting the characters into a plurality of words, calculating a plurality of numbers of movements required to be performed to input the words by using the direction keys of the remote controller respectively in order to generate a second key size configuration model of the virtual keyboard, and adjusting horizontal sizes of at least a part of the virtual keys of the virtual keyboard according to the second key size configuration model, so as to output the virtual keyboard of the second key size configuration model to the display and display the virtual keyboard of the second key size configuration model on the display.

12. The display device according to claim 11, wherein:
the controller generates a plurality of candidate models, wherein the candidate models have identical number of variables corresponding to the virtual keys respectively;
based on the candidate models, the controller further calculates the numbers of movements required to be performed to input each word of the words by using the plurality of direction keys of the remote controller respectively, and adds up information of the number of movements as a fitness function operation result;
the controller sorts the candidate models in a descending order according to the fitness function operation results of the candidate models; and
the controller selects one of the candidate models as the second key size configuration model according to the sorting order of the candidate models.

13. The display device according to claim 12, wherein:
the controller selects one of the candidate models, calculates the number of movements required to be performed to input each word of the words by using the plurality of direction keys of the remote controller respectively as the number of movements of the word; and
the controller adds up the numbers of a plurality of movements of the words as the fitness function operation result of the chosen candidate model.

14. The display device according to claim 12, wherein:
the controller selects a candidate model having a minimum fitness function operation result from the candidate models as the second key size configuration model.

15. The display device according to claim 11, wherein:
in at least one row of the virtual keyboard, the controller expands at least one key in the row in at least one direction of right or left.

16. The display device according to claim 15, wherein:
in the at least one row of the virtual keyboard, the controller stops expanding the rest keys in the row in the direction of right or left when the controller determines that a total number of the expanded part of virtual keys reaches a preset threshold.

* * * * *